(12) United States Patent
Shenzhi

(10) Patent No.: US 7,724,980 B1
(45) Date of Patent: May 25, 2010

(54) SYSTEM AND METHOD FOR SELECTIVE SHARPENING OF IMAGES

(75) Inventor: Zhang Shenzhi, Bellevue, WA (US)

(73) Assignee: Adobe Systems Incorporated, San Jose, CA (US)

(*) Notice: Subject to any disclaimer, the term of this patent is extended or adjusted under 35 U.S.C. 154(b) by 974 days.

(21) Appl. No.: 11/492,482

(22) Filed: Jul. 24, 2006

(51) Int. Cl.
   G06K 9/40 (2006.01)
   H04N 5/21 (2006.01)
(52) U.S. Cl. ........................................ 382/263; 348/625
(58) Field of Classification Search ................. 382/254, 382/263, 266, 298–300, 305, 312; 345/660; 341/50; 348/625
   See application file for complete search history.

(56) References Cited

U.S. PATENT DOCUMENTS

| | | | |
|---|---|---|---|
| 6,373,992 B1 | 4/2002 | Nagao | |
| 6,788,824 B1 * | 9/2004 | Prestia | 382/263 |
| 6,990,249 B2 | 1/2006 | Nomura | |
| 7,010,172 B1 | 3/2006 | Ito | |
| 7,064,770 B2 | 6/2006 | Lachine et al. | |
| 7,164,806 B2 * | 1/2007 | Prestia | 382/263 |
| 7,268,916 B2 * | 9/2007 | Kokemohr et al. | 358/1.9 |
| 7,340,482 B2 * | 3/2008 | Abhyankar et al. | 707/104.1 |
| 7,355,746 B2 * | 4/2008 | Murray et al. | 358/1.9 |
| 2004/0081370 A1 | 4/2004 | Murphy | |
| 2005/0069216 A1 | 3/2005 | Chien | |
| 2005/0089247 A1 | 4/2005 | Braun et al. | |
| 2005/0244074 A1 | 11/2005 | Shaked et al. | |
| 2006/0050083 A1 | 3/2006 | Lachine | |
| 2006/0077470 A1 | 4/2006 | Saquib | |

* cited by examiner

*Primary Examiner*—Kanji Patel
(74) *Attorney, Agent, or Firm*—Robert C. Kowert; Meyertons, Hood, Kivlin, Kowert & Goetzel, P.C.

(57) ABSTRACT

Selective Sharpening May Involve Sharpening Only Certain Portions Of an Image Or a certain percentage of the pixels of an image while avoiding over-sharpening already sharp areas and the introduction of signal noise in naturally uniform color and/or sharpness areas. A selective sharpening tool may selectively sharpen the image based on a user-indicated sharpening limit. For example, the user may select a particular portion of an image and specify that the least sharp 30% of the pixels in the selected image portion should be sharpened. In response, the selective sharpening tool may determine a sharpness value for each pixel in the image, rank each pixel based on its sharpness value and sharpen only the least sharp 30% of the pixels. Thus, a user may selectively sharpen a certain portion of an image (such as based on percentage of the pixels) while avoiding overly sharpening already sharp areas.

33 Claims, 7 Drawing Sheets

SYSTEM AND METHOD FOR SELECTIVE SHARPENING OF IMAGES

BACKGROUND

1. Field of the Invention

The present invention is directed to computer systems. More particularly, it is directed to sharpening of graphic images.

2. Description of the Related Art

People frequently over sharpen areas of an image because some images, or regions of images, may include areas that are sharp and areas that are not sharp. In an effort to sharpen the areas that are blurry, a user may inadvertently over sharpen areas that are already sharp. For example, a graphics tool may only be configured to sharpen every pixel in selected region. Additionally, traditional graphics programs frequently are configured only to sharpen the image as a whole. Moreover, while some graphics tools may allow a user to select a specific region for sharpening, it may be very difficult and tedious for the average user to manually select different regions for sharpening while avoiding those areas that are already sharp.

Some image tools may include an edge-sharpening algorithm that automatically attempts to locate and sharpen the edges of objects in an image. However, traditional edge-sharpening are not selective in the areas of the image to which edge-sharpening may be applied. In other words, if the image tool locates what it believes is an edge, it will sharpen it, typically without allowing any user control. Other traditional imaging sharpening techniques, such as Unsharp Mark (USM) may allow a user to specify a sharpening threshold to be applied to an entire image, thus often resulting in over-sharpening already sharp areas of the image.

FIGS. 1A, 1B, 1C and 1D illustrate sharpening of an image. Please note that FIGS. 1A, 1B, 1C and 1D are not meant to illustrate any particular method of sharpening, but instead are intended to illustrate general sharpening of an image. FIG. 1A illustrates an image that includes two overlapping ellipses with blurry edges as can be seen in FIG. 1C, which illustrates a magnified view of the section of FIG. 1A within the dashed rectangle. FIG. 1B illustrates the same section of FIG. 1A after applying sharpening. As is apparent from FIG. 1C, in which each rectangle of color may be considered a single pixel, the contrast in color between some pairs of adjacent pixels is higher than the contrast between other pairs of adjacent pixels. When sharpening is applied to the areas of the image in FIG. 1A that include higher contrast between adjacent pixels, the pixel values may be adjusted so as to provide even more contrast between adjacent or nearby pixels, as illustrated in FIG. 1D. Over sharpening an image may result in a 'halo' effect, as is illustrated in FIG. 1B.

SUMMARY

Selective sharpening, as described herein, may involve sharpening only certain portions of an image or a certain percentage of the pixels of an image (or a selected region of an image) while avoiding over-sharpening already sharp areas and reducing the introduction of signal noise in naturally uniform color and/or sharpness areas. A selective sharpening tool may, in some embodiments, selectively sharpen the image or a user-selected region of the image based on a user-indicated sharpening percentage. For example, the user may select a particular portion of an image and specify that the least sharp 30% of the pixels in the selected image portion should be sharpened. In some embodiments, the selective sharpening tool may be configured to determine a sharpness value for each pixel in the user-selected region, rank each pixel based on its sharpness value and sharpen only the least sharp 30% of the pixels. Thus, a user may selectively sharpen the least sharp areas (such as based on percentage of the pixels) an image while avoiding overly sharpening already sharp areas.

In order to avoid introducing noise in areas on an image that are uniform in sharpness or are naturally blurry, soft, or otherwise lacking in contrast, such as the sky, clouds, a wall, etc., a selective sharpening tool may not sharpening a certain percentage of the pixels that are the least sharp, according to some embodiments. For example, rather than simply sharpen the least sharp 30% of the pixels, a sharpening tool may be configured to not sharpen the least sharp 10% of the pixels.

In some embodiments, the selective sharpening tool may be configured to automatically determine the lower limit for sharpening and may not sharpen a percentage of the least sharp pixels corresponding to the determined lower limit. In other embodiments, the selective sharpening tool may allow a user to indicate or specify a lower limit for sharpening, such as by specifying a least sharp percentage of the pixels that should not be sharpened. In other words, in some embodiments, a user may specify sharpening limits that indicate that the selective sharpening tool should not sharpen the upper 30% of the pixels and also not sharpen the lower 30% of pixels. In other words, the selective sharpening tool may, in response, rank the pixels in order of sharpness and sharpen the 40% of the pixels between the $30^{th}$ and $70^{th}$ percentiles.

By not sharpening a least sharp percentage of pixels the selective sharpening tool may prevent attempting to sharpen areas of the image (or image-region) that don't need to be sharpened, but that naturally have low sharpness. For example, a portion of an image that includes a view of the sky may have low sharpness but the pixels in that area don't need to be sharpened because non-sharp values for pixels representing the sky may be correct. In other words, some portions of an image may naturally be soft or low contrast.

Figure 1A:
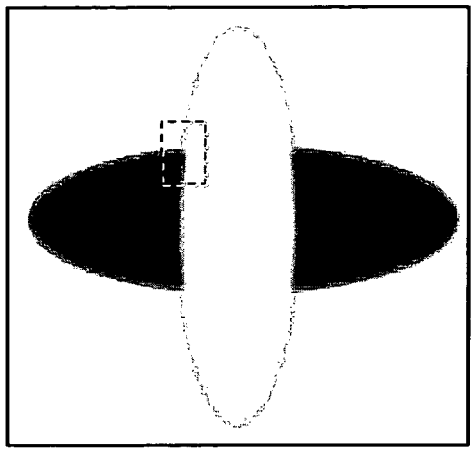
FIGS. 1A, 1B, 1C, to 1D illustrate the effects of sharpening an image.

While the user-driven document-based data collection system is described herein by way of example for several embodiments and illustrative drawings, those skilled in the art will recognize that the document-based data collection system is not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope of the document-based data collection system as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Selective sharpening, as described herein, may involve only applying a sharpening function to a certain percentage of the pixels of an image (or a selected region of an image) while reducing or avoiding over-sharpening already sharp areas and introducing signal noise in areas that naturally not sharp or are uniform in color and/or contrast. A selective sharpening tool may be configured to sharpen only a portion of the pixels of an image based on a user-selected region of the image and on a user-specified percentage. For example, the selective sharpening tool may be configured to allow the user to specify that only the least sharp 50% of the pixels should be sharpened. In one embodiment, the user may request sharpening on the entire image while in another embodiment the user may request sharpening on an irregularly shaped region of the image. In response the selective sharpening tool may process each pixel in the image (or a selected portion of the image) to determine where the image falls in a sharpness-based order. In other words, the selective sharpness tool may, in some embodiments, rank or order the pixels by sharpness in order to sharpen only a certain percentage of them, according to the user specified percentage. The selective sharpening tool may then calculate a new pixel value, such as by applying sharpening function, for each of pixels falling below or within the user indicated sharpening limit.

Please note that the term "pixel value" as used herein may refer to virtually any method of defining the color or graphic quality of an individual pixel. For example, in one embodiment, selective sharpening tool 120 may be configured to use red, green, blue (RGB) color values as a pixel's pixel value. In another embodiment, selective sharpening tool 120 may be configured to use hue, saturation and lightness (HSL) values or cyan, magenta, yellow and black (CMYK) values as pixel values. As the definition and uses of various methods of defining pixel values is well understood in the art, they will not be discussed further herein. Additionally, while selective sharpening is described herein in reference to sharpening an individual pixel, it should be realized that a single pixel is only "sharp" (or not) in relation to the other pixels near it, as is understood in the art.

Figure 2:
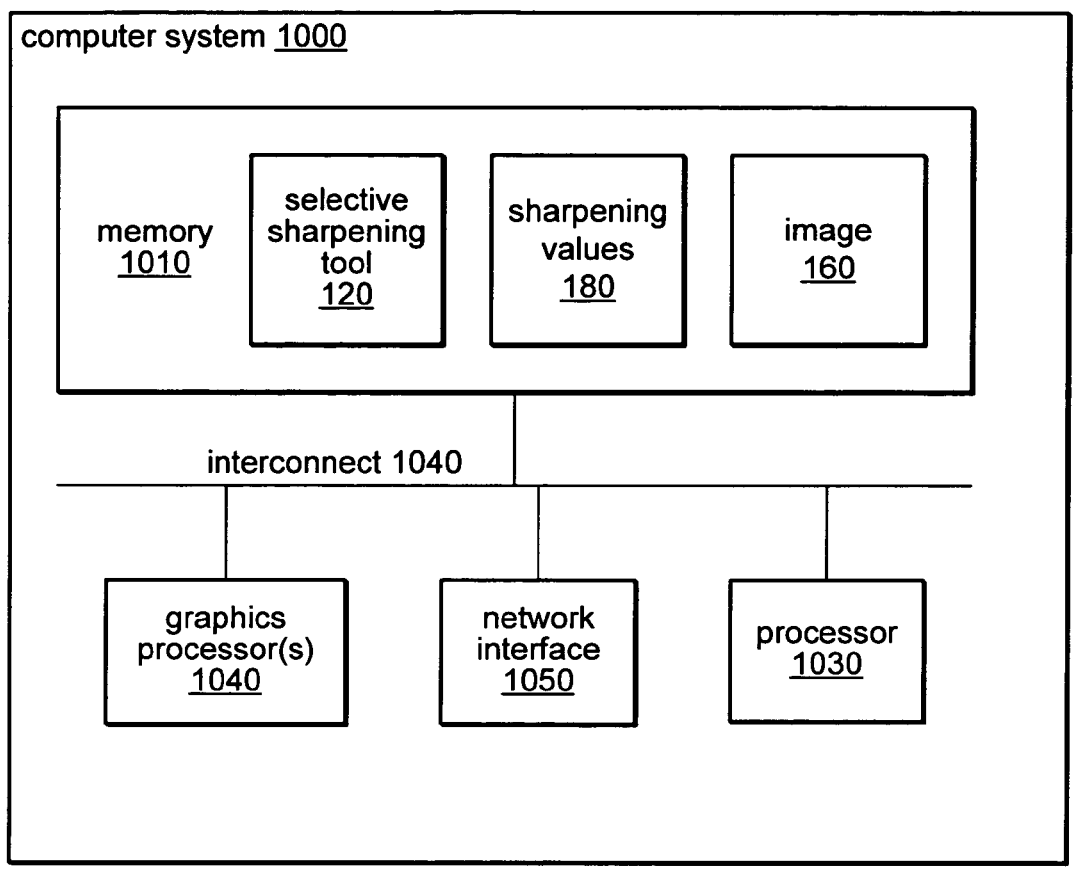
FIG. 2 is a block diagram illustrating a computer system suitable for implementing selective sharpening as described herein, according to one embodiment.

FIG. 2 is a block diagram illustrating one embodiment of a system implementing selective sharpening including a selective sharpening tool 120. Selective sharpening tool 120 may be implemented on a user computer in any of various manners, including as a software application, a hardware graphics processing system, or a combination of hardware and software, according to various embodiments. For instance, in some embodiments, selective sharpening tool 120 may be implemented as a software application, such as an image processing application, but in other embodiments may also be implemented as or as part of graphics processing hardware 1040, such as for a graphics accelerator card for a computer system. In yet other embodiments, selective sharpening tool 120 may be implemented as a combination of a software application and graphics hardware.

In one embodiment, computer system 1000 also stores an image 160 to be sharpened, such as a digital photo. In some embodiments, selective sharpening tool 120 may be configured to provide a user interface for a user to direct the sharpening of image 160. Alternatively, in other embodiments, selective sharpening tool 120 may be implemented as part of a larger graphics or media system that may provide such a user interface. The user may be able to graphically select a region of image 160 for sharpening in some embodiments. For instance, the user may select a rectangular, or differently shaped, image region using a mouse or other input device. Selective sharpening tool 120 may be configured to allow the user to specify a percentage of the specified region to sharpen. For instance, if a user specified that selective sharpening tool 120 should sharpen 100% of the pixels, selective sharpening tool 120 may sharpen the image (or of a region if an image region is selected). On the other hand, a user may indicate a sharpening limit of 75%, for example, and in response selective sharpening tool 120 may, in some embodiments, sharpen only those pixels that are not in the top 25% of sharpness. In other words, in some embodiments, selective sharpening tool 120 may allow the user to specify a sharpening limit as a percentile of the pixels ranked by sharpness and selective sharpening tool 120 may sharpen only pixels below the indicated percentile in terms of sharpness.

To put it another way, a user may be able to direct selective sharpening tool 120 to sharpen only the pixels that are not in the top 25% of sharpness, according to some embodiments. In response to a user specifying a sharpening limit, selective sharpening tool 120 may determine a sharpness value, using any of various sharpness measuring techniques, for each pixel (in the image or in a selected region) and rank or order the pixels by their respective sharpness values, according to one embodiment. While described mainly in reference to sharpening a single graphic image, such as a digital photo, selective sharpening as described herein may also be applied to other graphic media, such as to each frame of digital video, in some embodiments.

In some embodiments, selective sharpening tool 120 may also be configured to not sharpen pixels that are below a lower sharpening limit. For example, pixels in a portion of an image that naturally has low sharpness or contrast, such as sky, clouds, water, walls, or other broad fields of view may correctly have low sharpness values and hence fall into a low sharpness percentile when the pixels are ranked by sharpness. In other words, areas of naturally low sharpness may consequently be in the lowest percentiles of sharpness. However, it may not be appropriate to sharpen those pixels and portions of an image that naturally have low sharpness values. For example, sharpening such areas may result in the introduction of noise or other unnatural image artifacts. In other words, the sky may naturally appear blurry and sharpening those pixels may result in an unnatural looking sky. Please note that the term "sharpening limit" as used herein may refer to a sharpening limit including either a single (generally upper) limit or a sharpening limit including both a lower and an upper limit, according to different embodiments.

Accordingly, in some embodiments, selective sharpening tool 120 may be configured to allow the user to indicate a sharpening limit that includes both a lower and upper limit and selective sharpening tool 120 may not sharpen pixels that fall below the lower sharpening limit. In other words, selective sharpening tool 120 may be configured to allow the user to specify or otherwise indicate a sharpening range, such as in terms of sharpness percentiles and in response selective sharpening tool 120 may only sharpen pixels that fall within the indicated sharpening range when ranked or ordered according to sharpness. For example, a user may indicate that pixels between the 15% and 50% percentiles should be sharpened. In other embodiments, however, selective sharpening tool 120 may be configured to automatically determine a lower sharpening limit, or to use a fixed lower sharpening limit, rather than allowing the user to indicate such a lower sharpening limit.

Figure 3:
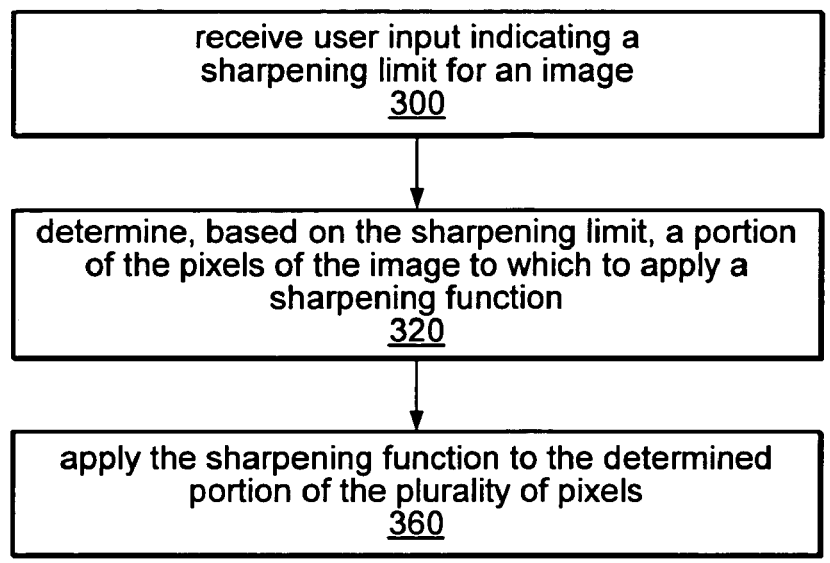
FIG. 3 is a flowchart illustrating one embodiment of a method for selective sharpening an image.

FIG. 3 is a flowchart illustrating one embodiment of a method for selective sharpening, as described herein. As described above, selective sharpening tool 120 may be configured to receive user input indicating a sharpening limit for an image, as illustrated in block 300, according to some embodiments. For example, in one embodiment selective sharpening tool 120 may be configured to allow the user to indicate a percentage of the image (e.g. in terms of a number of pixels) to sharpen. As noted above, a user might indicate that selective sharpening tool 120 should sharpen 50% of the image. Thus, selective sharpening tool 120 may, in response, sharpen the least sharp 50% of the pixels in the image, according to one embodiment. Additionally, the user may select a particular region or portion of the image, rather than the entire image, and then indicate that selective sharpening tool 120 should sharpen a certain percentage of that region or portion. In other words, in some embodiments, selective sharpening tool 120 may sharpen the least sharp 50% of the pixels of the selected region, ignoring those pixels of the image outside that region.

Please note that while mainly described herein regarding a user indicating a percentage of an image to sharpen (e.g. in terms of a number of pixels), in some embodiments, selective sharpening may involve, and selective sharpening tool 120 may be configured to implement, allowing a user to indicate a sharpening limit, and hence a portion of an image, in other manners. For example, selective sharpening tool 120 may allow the user to indicate a sharpening limit using a percentage of sharpness, an actual sharpness value, or other indicators usable to divide an image into a portion to be sharpened.

After the user has indicated a sharpening limit, as indicated by block 300, selective sharpening tool 120 may determine, based on the sharpening limit, a portion of the pixels of the image (or the selected region of the image) to which to apply a sharpening function, according to some embodiments. For example, selective sharpening tool 120 may compare a pixels sharpness percentile with lower and upper sharpening bounds. As described above, selective sharpening tool 120 may be configured to rank or order the pixels according to sharpness and to only sharpen those pixels that are below the user's indicated sharpening limit. Selective sharpening tool 120 may be configured to utilize any of numerous methods to normalize or otherwise rank or order the pixels according to the sharpness of the pixels. For example, in one embodiment, selective sharpening tool 120 may be configured to generate a histogram using the pixels' sharpness values (in memory, not generally displayed for a user). In another example, selective sharpening tool 120 may utilize any of various well-known sorting techniques to sort the pixels according to their respective sharpness. In other words, selective sharpening tool 120 may determine a sharpness percentile for a pixel based on a comparison of the pixel's sharpness value with the sharpness values for the other pixels in the image (or select portion of the image) to be sharpened. In some embodiments, selective sharpening tool 120 may be configured to implement more than one sharpening function and may allow the user to select which sharpening function should be used when sharpening an image.

In some embodiments, selective sharpening tool 120 may be configured to determine which of the pixels to sharpen without actually exactly ordering all the pixels according to their sharpness. In other words, selective sharpening tool 120 may determine which pixels are the least sharp 30% without actually determine the exact ordering of the sharpest 70%. To put it another way, if selective sharpening tool 120 determines that a pixel is sharper than the least sharp 30% selective sharpening tool 120 may not have to determine the exact ranking of the pixel amongst the sharper 70% of the pixels.

As illustrated by block 360, selective sharpening tool 120 may then apply a sharpening function to the pixels that fall below, in terms of their sharpness, the user's indicated sharpening limit, according to one embodiment. Selective sharpening tool 120 may, in different embodiments, utilize any of various well-known sharpening functions when sharpening an image. As part of applying the sharpening function, selective sharpening tool 120 may determine or calculate a new pixel value (e.g. RGB, HSL, etc) for each pixel being sharpened and replace or substitute the new value for the original value in the image.

Additionally, please note that, selective sharpening tool 120 may be configured to allow the user to repeat the sharpening of an image and to specify the same or different sharpening limit each time. In other words, a user may first direct selective sharpening tool 120 to sharpen 70% of an image and then have selective sharpening tool 120 sharpen 30% of the image, producing a cumulative sharpening effect.

As described above regarding FIG. 3, selective sharpening tool 120 may allow the user to indicate a sharpening limit, such as representing a percentage of an image to be sharpened, according to some embodiments. In other embodiments, however, selective sharpening tool 120 may also be configured to allow the user to indicate a sharpening limit that includes both lower and upper sharpening limits. Thus, a user may be able to specify that pixels between the $15^{th}$ and $40^{th}$ percentile of sharpness should be sharpened. In some embodiments, allowing the user to indicate both lower and upper sharpness limits may avoid over sharpening already sharp areas and reduce or eliminate introducing noise to areas of naturally uniformly low sharpness that should not be sharpened.

Figure 4:
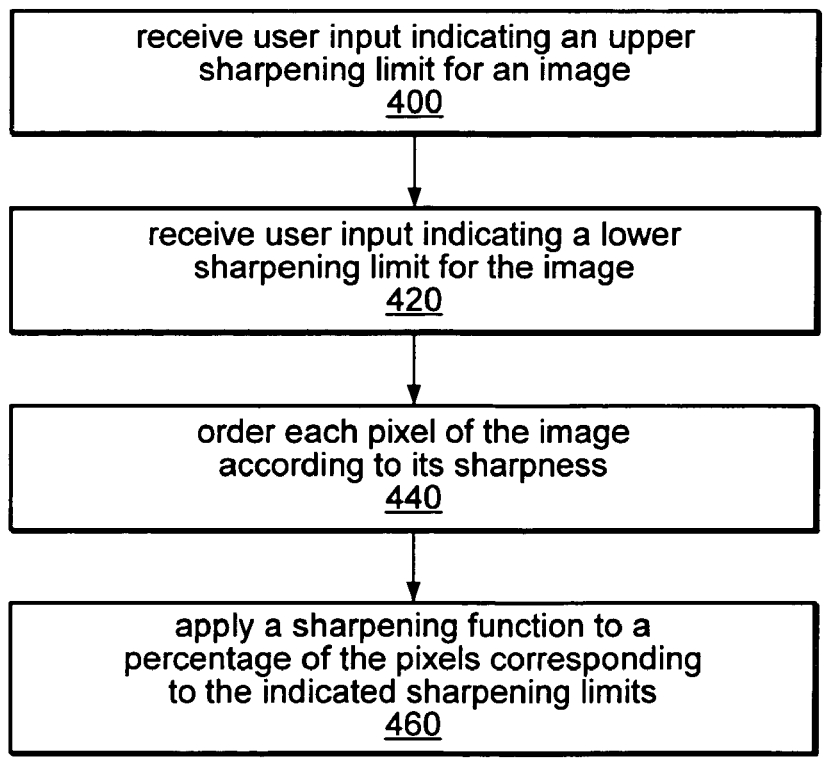
FIG. 4 is a flowchart illustrating one embodiment of a method for selective sharpening according to a sharpening limit.

FIG. 4 is a flowchart illustrating one embodiment of a method for selective sharpening including a user-indicated lower sharpening limit. As indicted by block 400, selective sharpening tool 120 may receive user input indicating an upper sharpening limit for an image and may also receive user input indicating a lower sharpening limit for the image, as indicated by block 420, according to some embodiments. As described above, selective sharpening tool 120 may be configured not to sharpen pixels that are below a user indicated sharpening limit, such as to avoid sharpening areas that are naturally uniform in color or contrast (or otherwise less sharp) and perhaps should remain so for overall image quality. While described herein mainly in terms of a user-indicated lower sharpening limit, selective sharpening, as described herein, may also be implemented using a fixed hard-coded, or automatically determined lower sharpening limit, according to various embodiments.

After receiving user input indicating a sharpening limit, such as including both upper and a lower sharpening limits, selective sharpening tool 120 may, in some embodiments, order or rank each pixel according to its sharpness, as indicated by block 440. Selective sharpening tool 120 may determine which pixels fall within the percentage indicated by the sharpening limits. Thus, in some embodiments, selective sharpening tool 120 may be configured to determine a sharpness value for each pixel in order to rank or order the pixels according to their sharpness value. Selective sharpening tool 120 may then use the pixels' sharpness values which pixels to sharpen according to the sharpening limits. As noted above, selective sharpening tool 120 may not have to determine an absolute and complete ordering for every pixel. Instead, in some embodiments, selective sharpening tool 120 may be configured to determine which pixels are in the percentage of the pixels to be sharpened without actually determining the exact order of the pixels.

As described above and indicated by block 460, selective sharpening tool 120 may apply a sharpening function to a percentage of the pixels corresponding to the indicated sharpening limits. Thus, selective sharpening tool 120 may sharpen that percentage of the pixels between two percentiles indicated by the lower and upper sharpening limits. For example, if a user indicated that 30% of the image should be sharpened, and that the lowest 15% of the image should not be sharpened, just as to avoid introducing noise, selective sharpening tool 120 may sharpen those 30% of the pixels falling between the $15^{th}$ and $45^{th}$ percentile. Please note that while being described herein as sharpening pixels between percentiles indicated by sharpening limits, in some embodiments selective sharpening tool 120 may be configured to sharpen the pixels between the indicated percentiles inclusively. In other words, selective sharpening tool may sharpen those pixels that fall on or between the $15^{th}$ and $45^{th}$ percentile, using the example above.

Figure 5:
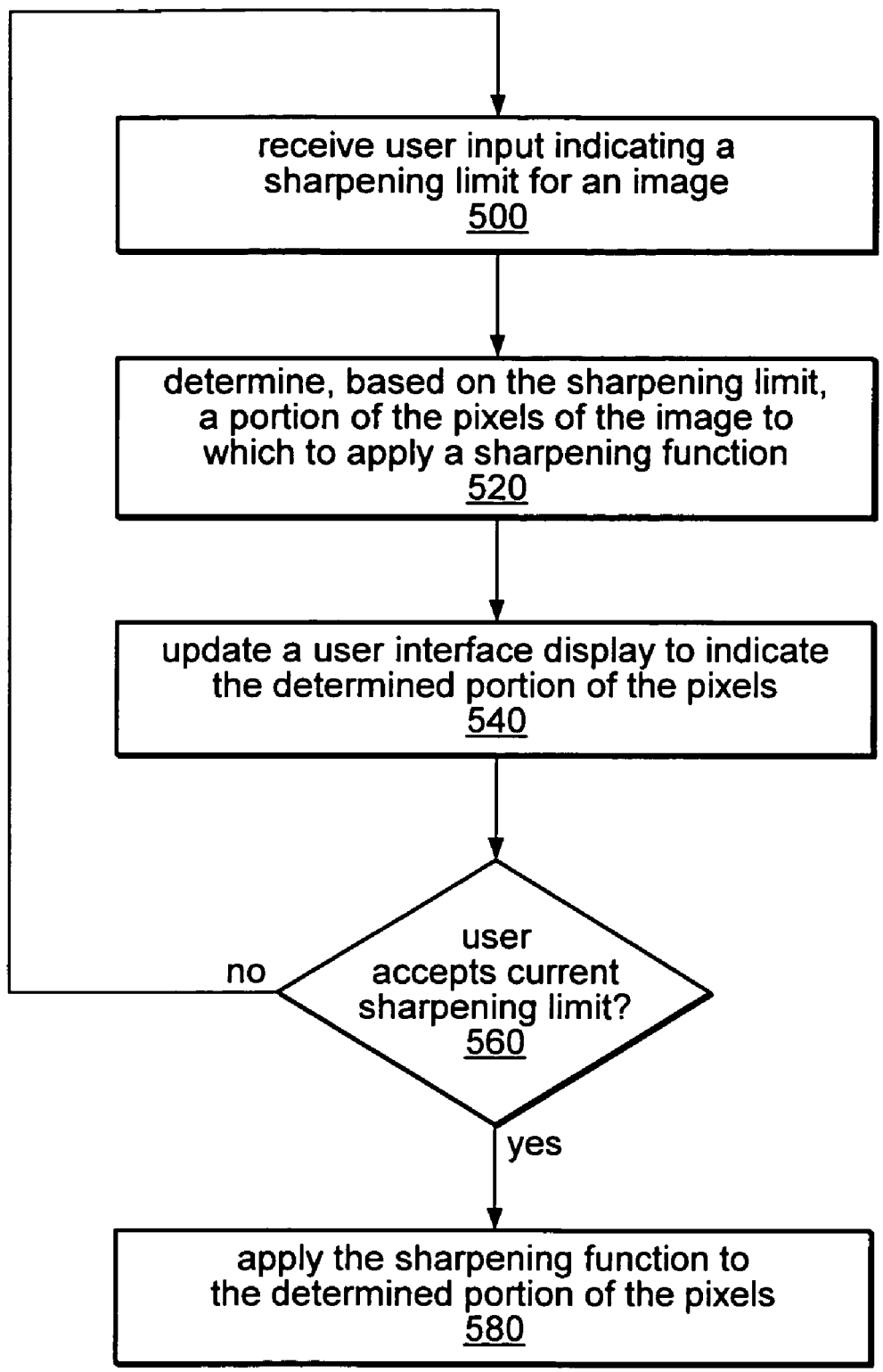
FIG. 5 if a flowchart illustrating one embodiment of a method for indicating the portion of an image effected by selective sharpening, as described herein.

Selective sharpening tool 120 may be configured to provide a visual indication to the user of the pixels or portion of an image that will be modified by sharpening according to the user's indicated sharpening limit. Thus, selective sharpening tool 120 may provide the user more control and selectively over which portion of the image to sharpen. For example, a user may indicate a percentage of an image to sharpen and selective sharpening tool 120 may provide visual feedback indicating what pixels or portions of the image fall within the user's indicated sharpening limit and allowing the user to adjust the sharpening limit so as to include only the portion of the image the user desires to sharpen, according to one embodiment. FIG. 5 is a flowchart illustrating one embodiment of a method for displaying to the user the portion of an image to be sharpened according to selective sharpening.

As indicated by block 500 and described above, selective sharpening tool 120 may receive user input indicating a sharpening limit for an image, according to some embodiments. As noted above, in some embodiments, the user input may indicate both upper and lower sharpening limits while in other embodiments, only a single (upper) sharpening limit may be indicated. For example, the user may indicate that selective sharpening tool 120 should sharpen 50% of an image. In response, selective sharpening tool 120 may determine, based on the sharpening limit, a portion of the pixels of the image to which to apply a sharpening function, as indicated by block 520 according to some embodiments. As described above, in one embodiment selective sharpening tool 120 may rank or order the pixels according to sharpness, such as by using a calculated sharpness value for each pixel to determine the portion of the pixels to which the sharpening function may be applied.

In some embodiments, selective sharpening tool 120 may update a user interface display to indicate the determined portion of the pixels, as illustrated by block 540. For example, selective sharpening tool 120 may, in some embodiments, highlight those pixels (using any of various well-known pixel highlighting techniques) to which the sharpening function will be applied, as indicated by the sharpening limit. For instance, selective sharpening tool 120 may change the color of the pixels, cause the pixels to flash, or outline the pixels using a broken and/or flashing line, among other techniques to indicate which pixels would be sharpened by the current sharpening limit.

If, as indicated by the positive output of decision block 560, the user accepts the current sharpening limit, selective sharpening tool 120 may apply the sharpening function to the determined portion of the pixels, as illustrated by block 580. If, however, the user does not accept the current sharpening limit, such as by changing the sharpening limit, selective sharpening tool 120 may receive new, different or additional user input indicating a new, different or additional sharpening limit for the image, as indicated by the negative output of decision block 560 leading to block 500. For example, the user may initially specify a sharpening limit of 70%, indicating the least sharp 70% of the pixels of an image should be sharpened and selective sharpening tool 120 may then visually indicate which portions of the image comprise the least sharp 70% of the pixels. The user may then decide to sharpen only 60% of the image instead the initially indicated 70%. Thus, the user may change the sharpening limit to indicate that the least sharp 60% of the image should be sharpened. In response to the user changing the sharpening limit, selective sharpening tool 120 may update the display to indicate which portion of the image (e.g. which pixels) would be modified (i.e. sharpened) according to the current sharpening limit. Additionally, the user may decide to add a lower sharpening limit to the current sharpening limit. In response selective sharpening tool 120 may again update the display to indicate the portion of the image to be sharpened according to the new sharpening limit including both the lower and upper sharpening limit.

Figure 6A:
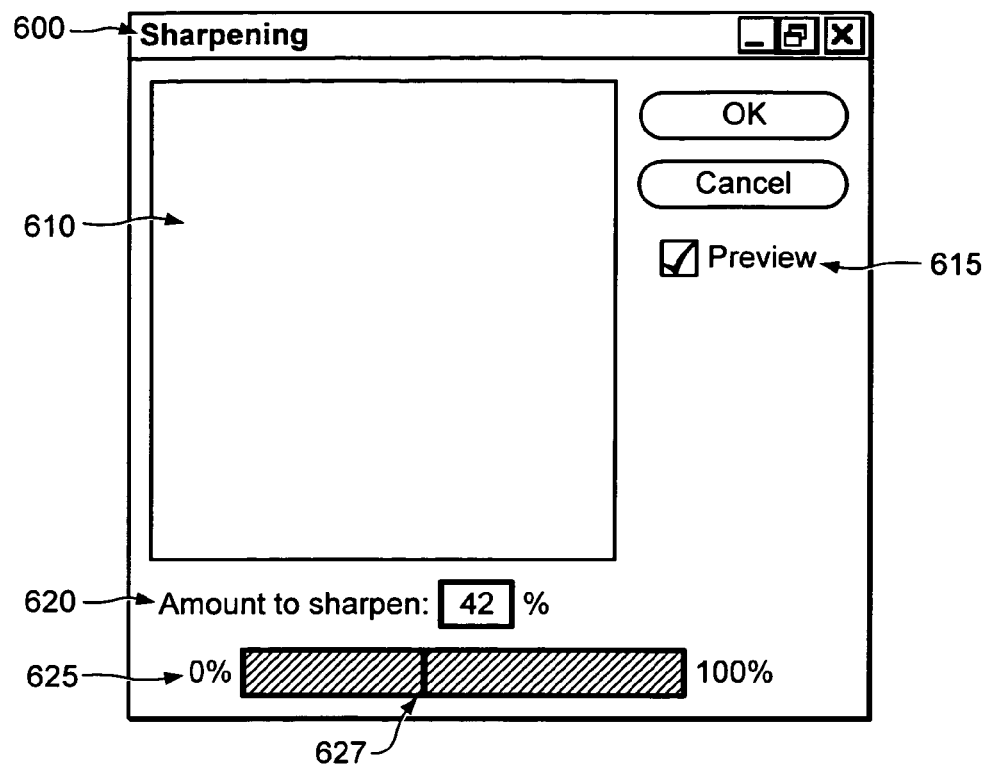
FIGS. 6A, 6B and 6C are block diagrams illustrating user interfaces for selective sharpening, according to various embodiments.

Thus, selective sharpening tool 120 may be configured to allow the user to repeatedly and interactively indicate different sharpening limits until satisfied with the portion of the image that will be sharpened. FIG. 6A illustrates one embodiment of a user interface that may, in some embodiments, be displayed by selective sharpening tool 120 for receiving user indicated sharpening limits and for indicating that portion of an image that will be sharpened according to the indicted sharpening limit. For example, selective sharpening tool 120 may display user interface 600 in order to allow the user to indicate a amount or percentage of the image (or a selected region or portion of the image) to sharpen. Thus, selective sharpening tool 120 may include a user input control allow the user to indicate the sharpening limit, such as user interface controls 620 and 625, in one embodiment. User interface control 620 may represent a text entry box allowing the user to type a numeric percentage to indicate a sharpening limit while control 625 may represent a slider-type control allow the user to graphically represent a sharpening limit, such as by moving indicator 627 via a mouse-type interface. In some embodiments, selective sharpening tool 120 may synchronize or link controls 620 and 625 such that when the user changes or updates the value indicated by one of the controls, selective sharpening tool 120 may update the other control to indicate the save value.

Additionally, user interface 600 may, in some embodiments, include image control 610 in which selective sharpening tool 120 may visually indicate the portion of an image to be sharpened as indicted by the current sharpening limit. Thus, when the user indicates a sharpening limit, such as by using controls 620 and/or 625, selective sharpening tool 120 may display a version of the image to be sharpened in image control 610 that may indicate which portion (or which pixels) of the image will be sharpened according to the current sharpening limit. For example, in some embodiments, selective sharpening tool 120 may be configured to highlight the portion (or pixels) of the image indicated by the current sharpening limit. As noted above selective sharpening tool 120 may be configured to change the color of pixels, cause pixels to flash, or outline pixels using a flashing, broken line, in various embodiments, in order to indicate which pixels will be sharpened according to the current sharpening limit.

As described above, selective sharpening tool 120 may rank or order the pixels of an image (or of a selected region of the image) in order to determine which pixels fall below or within a sharpening limit. In some embodiments, selective sharpening tool 120 may link each pixel in the ordered set with the pixel's location in the image, such as to facilitate indicating the portion of the image that will be sharpened according to a current sharpening limit. As various methods and techniques for linking different entries of different data structures, such as an ordered set of pixels and their respective locations (e.g. X,Y) within an image, they will not be discussed in detail herein. However, please note that selective sharpening tool 120 may be configured to utilize any suitable method to determine the image location (e.g. X,Y location) of a pixel so as to display a visual, indication of the portion of an image that will be sharpened according to a current sharpening limit.

Alternatively, in another embodiment, selective sharpening tool 120 may be configured to update a full size or main display of an image to indicate which portion of an image may be sharpened according to a current sharpening limit. Thus, selective sharpening tool 120 may be configured to display user interface 600 including control 620 and/or control 625 but not including image control 610. In other embodiments, however, image-selection tool 120 may be configured to provisionally apply the sharpening function the pixels in a main or full-scale view of the image, thus allowing the user to see, and approve, the actual results of the sharpening. Selective sharpening tool 120 may then allow the user to undo, cancel, reverse, or otherwise "back out of" the sharpening if the user decides to modify the sharpening parameters, such as the selected region, sharpening limit, and in some embodiments, the sharpening function to use, or not to sharpen the image after all.

Additionally, selective sharpening tool 120 may be configured to include control 615 in user interface 600, thus allowing the user to specify whether or not selective sharpening tool 120 should visually indicate, such as via image control 610, the portion of an image that will be sharpened according to the current sharpening limit.

Figure 6B:
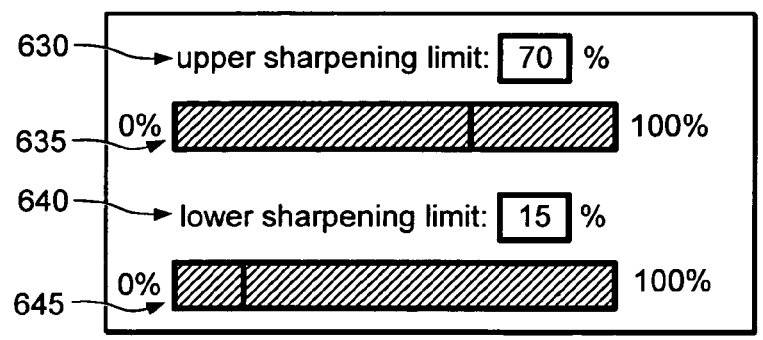
Figure 6C:
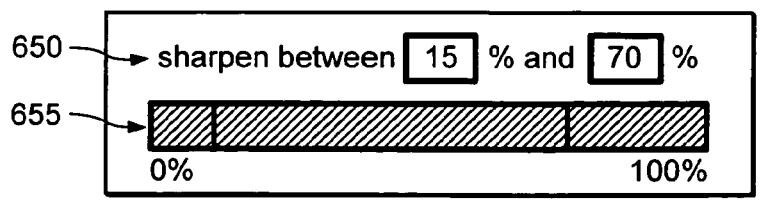

While the user interface in FIG. 6A illustrates controls allow the user to indicate a single sharpening limit, such as to request sharpening of a certain percentage of an image, FIG. 6B is a block diagram illustrating an embodiment in which selective sharpening tool 120 allows the user to indicate a sharpening limit including both upper and lower limits. Thus, in some embodiments, selective sharpening tool 120 may be configured to display separate sets of controls allowing the user to indicate a sharpening limit including both upper and lower limits. For example, selective sharpening tool 120 may display controls 630 and 635 allowing the user to indicate an upper sharpening limit, while displaying controls 640 and 645 allowing the user to indicate a lower sharpening limit. As noted above, control 630 and 635 may be synchronized and/or linked so that when the user updates one control selective sharpening tool 120 may update the other to reflect the new user value. Similarly, controls 640 and 645 may also be synchronized or liked. In some embodiments, selective sharpening tool 120 may display a single set of controls allowing the user to specify a sharpening limit including both lower and upper sharpening limits. FIG. 6C is a block diagram illustrating controls 650 and 655 via selective sharpening tool 120 may allow the user to indicate both a lower and an upper sharpening limit, according to one embodiment.

Figure 7:
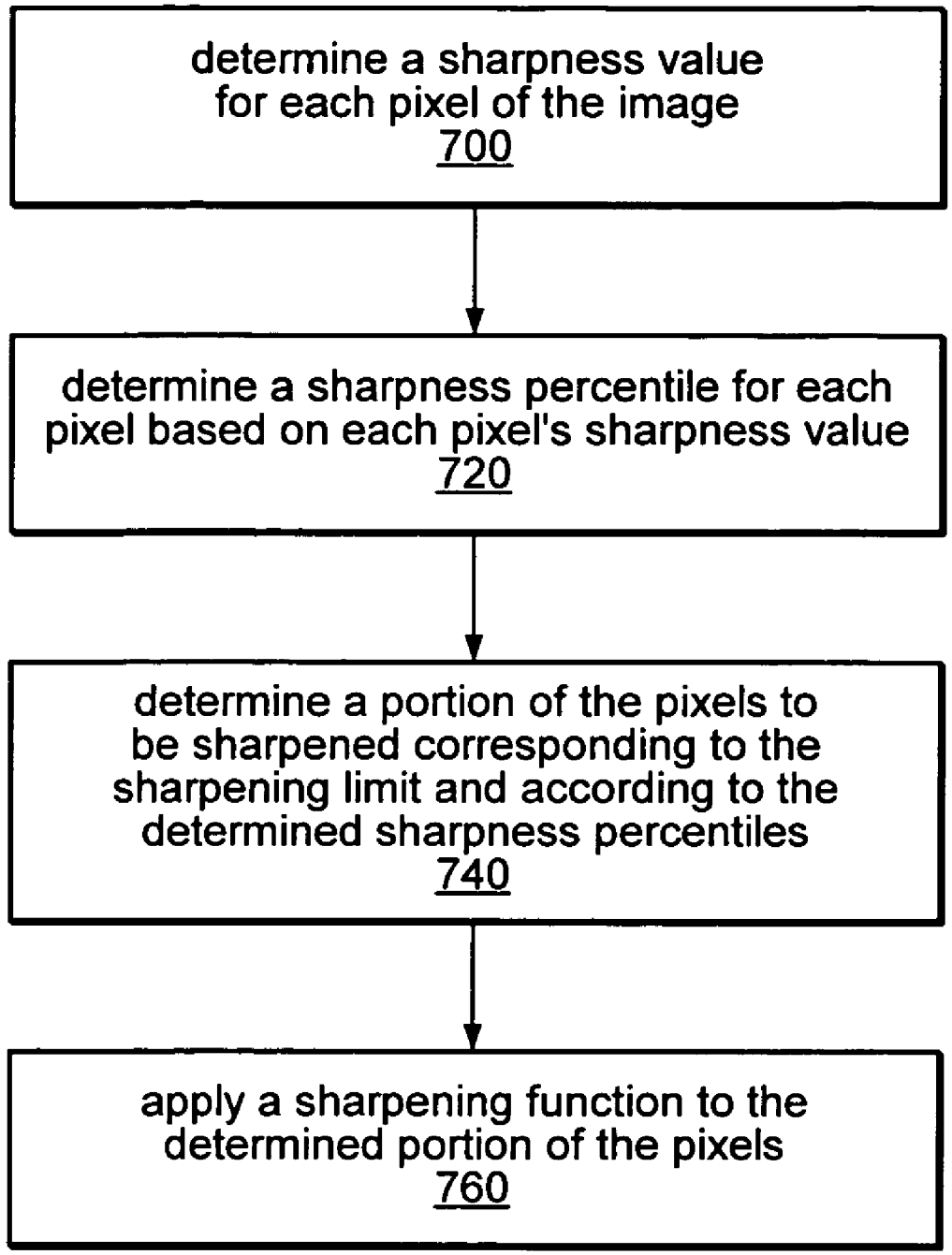
FIG. 7 is a flowchart illustrating one embodiment of a method for determining the portion of an image's pixel to be sharpened according to selective sharpening, as described herein.

As described above, selective sharpening tool 120 may be configured to rank or order the pixels of an image in order to determine which portion or pixels of the image should be sharpened according to a current sharpening limit. FIG. 7 is a flowchart illustrating one embodiment of a method for selectively sharpening including assigned a sharpness value to pixels. As described above, selective sharpening tool 120 may be configured to allow a user to indicate a sharpening limit used determine which pixels of an image (or image region) to sharpen (i.e. by applying a sharpening function to the determined pixels). In response, selective sharpening tool 120 may determine a sharpness value for each pixel of the image, as illustrated by block 700. In some embodiments, selective sharpening tool 120 may be configured to go through each pixel of the image and determine a sharpness value for each pixel in turn. In other embodiments, however, selective sharpening tool 120 may be part of or include a multi-processor system, such as a graphics processors (1040), and may be configured to implement determining sharpness values for different pixels in parallel using multiple processors. The sharpness value determined for a pixel may reflect the sharpness of a pixel or the relative sharpness of the pixel when compared to other pixels, according to various embodiments.

After determining sharpness values for all the pixels in the region selective sharpening tool 120 may, in some embodiments, determine a sharpness percentile for each pixel based on each pixel's respective sharpness value, as indicated by block 720. As noted above, selective sharpening tool 120 may be configured to rank the pixels by their sharpness. Thus, in some embodiments, selective sharpening tool 120 may determine a pixel's sharpness percentile in order to, or as part of, ranking or ordering the pixels by sharpness based on each pixel's determine sharpness value. For example, in one embodiment, selective sharpening tool 120 may normalize the sharpness values for pixels to be between 0 and 100, thus creating a percentile for each pixel. In another embodiments, selective sharpening tool 120 may be configured to generate and use a histogram to determine percentiles based on the sharpness values for the pixels.

As illustrated by block 740, selective sharpening tool 120 may be configured to determine whether the portion of the pixels for sharpened corresponding to the sharpening limit and according to the determined sharpness percentiles, according to some embodiments. Selective sharpening tool 120 may use the determined sharpness percentiles to determine those pixels that fall within a user indicated sharpening limit, such as a sharpening limits include either a single sharpening limit or that include both lower and upper sharpening limits. In other words, selective sharpening tool 120 may allow the user to request that the pixels that are under the 70% percentile of sharpness should be sharpened and also may allow the user may request that selective sharpening tool 120 not sharpen pixels that are below the 15% percentile of sharpness, such as to avoid unnecessarily introducing noise (e.g. unnecessary or unnatural contrast) in areas of relatively uniform color or contrast (such as the sky).

As described above, selective sharpening tool 120 may be configured to display a visual indication of the determined portion of the pixels to be sharpened, such as by using user interface 600 including image control 610. After determining the portion of the pixels to be sharpened, as discussed above, selective sharpening tool 120 may apply a sharpening function to the determined portion of the pixels, as illustrated by block 760, to sharpen the image according to the user's indicated sharpness limit. As noted above, selective sharpening tool 120 may be configured to rank and determine sharpness percentiles for pixels every time the user indicates a different sharpness limit or when the user selects a different region of the image for sharpening.

Figures 8A, 8B:
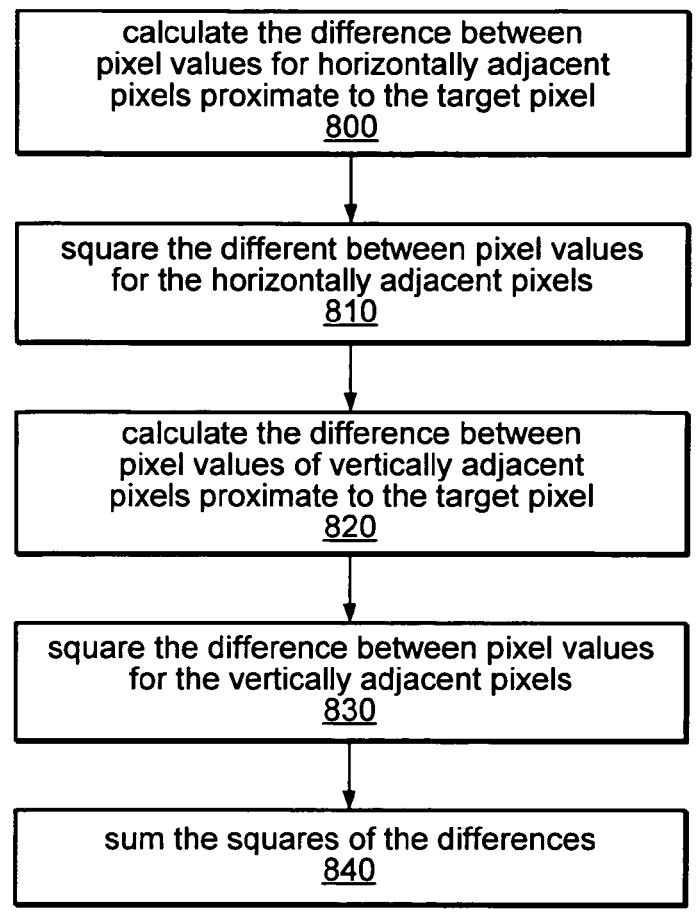
FIG. 8A is a flowchart illustrating one embodiment of a method for determining a sharpness value for a pixel.
FIG. 8B is a block diagram logically illustrating pixels whose values are used to determine a sharpness value, according to one embodiment.

As described above, selective sharpening tool 120 may, in some embodiments, determine a sharpness value for each pixel in an image to be sharpened. In some embodiments, the region to be sharpened may be the entire image while in other embodiments the region may be a regularly (e.g. rectangle) or irregularly shaped region, as described above. FIG. 8A is a flowchart illustrating one embodiment of a method for determining a sharpness value for a pixel. Additionally FIG. 8B is a block diagram illustrating pixels of an example image that will be discussed in reference to the flowchart illustrated by FIG. 8A. As described above, selective sharpening tool 120 may be configured to allow a user to indicate a region of an image to be sharpened and a sharpness limit. For example, a user may specify a sharpening limit of 70%, thus requesting selective sharpening tool 120 to sharpen the least sharp 70% of the pixels in the image.

In order to determine which of the pixels represent the least sharp 70%, selective sharpening tool 120 may be configured to calculate a sharpness value for each pixel. For example, in order to determine a pixel's sharpness value, selective sharpening tool 120 may, in some embodiments, be configured to calculate a squared differential value along the horizontal and vertical axis around the pixel's position in the image region. In one embodiment, selective sharpening tool 120 may calculate the difference between the pixel values for horizontally adjacent pixels that are proximate to the target pixel (i.e. the pixel for which a sharpness value is being determined), as illustrated by block 800 of FIG. 8A. For example, selective sharpening tool 120 may determine the difference in the pixel values for adjacent pixels along the horizontal row of the target pixel for a short distance on either side of the target pixel. Referring to FIG. 8B, selective sharpening tool 120 may, when determining a sharpness value for pixel 850 (the center pixel of FIG. 8B) calculate the difference between the adjacent pixels along the horizontal row and along the vertical column of pixel 850, including the target pixel 850 (e.g. the highlighted boxes of FIG. 8B). Thus, in one embodiment, selective sharpening tool 120 may calculate the difference between the pixel values of pixels 854 and 852. Similarly, selective sharpening tool 120 may also calculate the difference between the pixel values of pixels 850 and 854, 856 and 850, and pixels 858 and 856. Thus, selective sharpening tool 120 may calculate the differences between the pixel values for pairs of horizontally adjacent pixels in the row of, and proximate to, the target pixel.

As illustrated by block 810 of FIG. 8A, selective sharpening tool 120 may then square the difference between the pixel values for the horizontally adjacent pixels. For example, referring again to FIG. 8B, after calculating the difference between horizontally adjacent pixels 854 and 852 as described above selective sharpening tool 120 may then square the resultant difference. Similarly, selective sharpening tool 120 may square the differences between the pixel values of pixels 850 and 854, 856 and 850, and pixels 858 and 856. In one embodiment, selective sharpening tool 120 may be configured to determine the differences between all the pairs of pixels prior to squaring the differences. In other embodiments, however, selective sharpening tool 120 may square the difference between the pixel values of each individual pair of pixels before moving on to take the difference between the pixel values of the next pair of pixels. In general, the order of the calculations for determining a sharpness value may be performed in any ordered allowed by the governing mathematic principals (as long as the different order does not change the resultant sharpness value). In yet other embodiments, selective sharpening tool 120 may include, or be configured to take advantage of, multi-processing hardware and thus, may be configured to determine, and square, the differences between the pixel values of multiple pairs of pixels in parallel.

Selective sharpening tool 120 may also be configured to calculate and square the differences between pairs of vertically adjacent pixels proximate to the target pixel, as illustrated by blocks 820 and 830, when determining the sharpness value for the target pixel. For example, referring again to FIG. 8B, selective sharpening tool 120 may be configured to determine, and square, the difference between pairs of pixels 862 and 860, 850 and 862, 864 and 850, and pixels 866 and 864, according to one embodiment. As with the calculating and squaring of the pixel values of horizontally adjacent pixels described above, when calculating and squaring of the pixel values of vertically adjacent pixels proximate to the target pixel, selective sharpening tool 120 may perform the differencing and squaring for individual pairs of pixels sequentially or in parallel, and in virtually any order, according to various embodiments.

Additionally, as illustrated by block 840, selective sharpening tool 120 may sum the individual squares of the differences for both the horizontally and vertically adjacent pixel pairs, in one embodiment, to determine the sharpness value of the target pixel. Thus, the sharpness value of an individual pixel, such as pixel 850, may be calculated by summing the squared differences of pairs of adjacent pixels that are around the target pixel. Thus, the more difference between the pixel values of adjacent pixels near the target pixel, the larger the sharpness value for the target pixel.

Thus, selective sharpening tool 120 may determine the sharpness value (SV) for a pixel at location (i,j) using the following equation:

$$SV(i,j) = \text{Sum On } K \text{ from } (-2,1)\{\text{square}(p(i+k,j)-(i+k+1,j))\} + \text{Sum On } K \text{ from } (-2,1)\{\text{square}(p(i,j+k)-p(i,j+k+1))\}$$

The following pseudo code illustrates one embodiment for determining the sharpness value of a target pixel, as described herein:

$$\begin{aligned}SV(I, j) = &\ \text{square}(p(i-2, j) - p(i-1, j)) + \\ &\ \text{square}(p(i-1, j) - p(i, j)) + \\ &\ \text{square}(p(i, j) - p(i+1, j)) + \\ &\ \text{square}(p(i+1, j) - p(i+2, j)) + \\ &\ \text{square}(p(i, j-2) - p(i, j-1)) + \\ &\ \text{square}(p(i, j-1) - p(i, j)) + \\ &\ \text{square}(p(i, j) - p(i, j+1)) + \\ &\ \text{square}(p(i, j+1) - p(i, j+2))\end{aligned}$$

While in some embodiments, image-selection tool 120 may be configured to allow a user to specify a sharpening limit, such as described above regarding FIG. 3, in some embodiments selective sharpening may involve automatic selection, such as by image-selection tool 120, of a sharpening limit. For example, selective sharpening tool 120 may be configured to analyze sharpness values for pixels in a region of an image to be sharpened and to detect a sharpness threshold within the region. If selective sharpening tool 120 detects such a sharpness threshold, selective sharpening tool 120 may be configured to apply selective sharpening using a upper sharpening limit corresponding to the detected threshold. In another embodiment, selective sharpening tool 120 may be configured to detect a sharpening threshold and to suggest to the user an sharpening limit based on the detected threshold. For example, selective sharpening tool may display, such using controls 620 and 625 of user interface 600, a default or suggested sharpening limit based on a user's selected image region (or the entire image) to be sharpened. In some embodiments, selective sharpening tool 120 may also detect a lower sharpening threshold and may accordingly use or suggest a sharpening limit that includes a lower sharpening limit.

Additionally, the discussion regarding determining a pixel's sharpness value in reference to FIG. 8B describes summing the differences between pixels that were located within two pixels of the target value. However, the discussion above and FIG. 8B represent only one exemplary embodiment of selective sharpening. In other embodiments, selective sharpening tool 120 may use different or different numbers of pixels when determining a target pixel's sharpening value. In general selective sharpening tool 120 may be configured to use any of various methods for determining the sharpness value of a target pixel, according to different embodiments.

For instance, while the method for determining the sharpness value for a target pixel described above summed the squares of the differences in pixel values between pairs of horizontally and vertically adjacent pixels proximate to the target pixel, in some embodiments, other pairs of pixels may be used when determining the sharpness value for a pixel. In one embodiment, selective sharpening tool 120 may be configured to sum the squares of the differences between the pixel values of diagonally adjacent pixels proximate to the target pixel. Referring again to FIG. 8B, for instance, selective sharpening tool 120 may be configured to sum the squares of the differences between pairs of pixels 882 and 880, 880 and 850, 850 and 878, 878 and 876, 868 and 870, 870 and 850, 850 and 872, and pixels 872 and 874, according to one embodiment. In yet another embodiment, selective sharpening tool 120 may be configured to sum the squares of the differences between adjacent pairs of pixels that are adjacent to the target pixel. For example, selective sharpening tool 120 may sum the squares of the differences between pixel values for pixel pairs 870 and 862, 862 and 880, 854 and 850, 850 and 856, 878 and 864, 864 and 872, 870 and 854, 854 and 878, 862 and 850, 850 and 864, 880 and 856, and pixel pair 856 and 872. In some embodiments, selective sharpening tool 120 may be configured to allow the user to specify or select the exact manner of determining a sharpness values, such as by selecting a particular scheme of pixel pairs to use.

In other embodiments, selective sharpening tool 120 may be configured to use a different method of determining a sharpness value for a pixel that doesn't involve summing the squares of differences between pixel values. For instance, in one embodiment, selective sharpening tool may be configured to compare a high-frequency and a low frequency versions or masks of an image to determine the difference between the two versions and then use the frequency difference to determine a pixel's sharpness value.

Selective sharpening, as described herein may be implemented on various types of computer systems. Referring again to FIG. 2, computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, or in general any type of computing device.

The selective sharpening tool 120 described herein may be provided as a computer program product, or software, that may include a computer-readable storage medium having stored thereon instructions, which may be used to program a computer system (or other electronic devices) to implement a selective sharpening tool as described herein. A computer-readable storage medium includes any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

A computer system 1000 may includes a processor unit 1030 (possibly including multiple processors, a single threaded processor, a multi-threaded processor, a multi-core processor, or other type of processor). The computer system 1000 may also include one or more system memories 1010 (e.g., one or more of cache, SRAM DRAM, RDRAM, EDO RAM, DDR RAM, SDRAM, Rambus RAM, EEPROM, or other memory type), an interconnect 1040 (e.g., a system bus, LDT, PCI, ISA, or other bus type), and a network interface 1050 (e.g., an ATM interface, an Ethernet interface, a Frame Relay interface, or other interface). The memory medium 1010 may include other types of memory as well, or combinations thereof. Embodiments of the selective sharpening tool described herein may include fewer or additional components not illustrated in FIG. 10 (e.g., video cards, audio cards, storage devices, additional network interfaces, peripheral devices, or other components). The processor unit 1030, the network interface 1050, and the system memory 1010 may be coupled to the interconnect 1040. It should also be noted that one or more components of system 1000 might be located remotely and accessed via a network. One or more of the system memories 1010 may embody a selective sharpening tool 120.

Figure 1B:
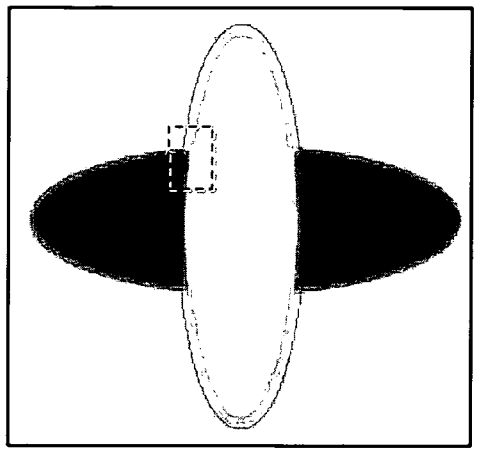
Figure 1C:
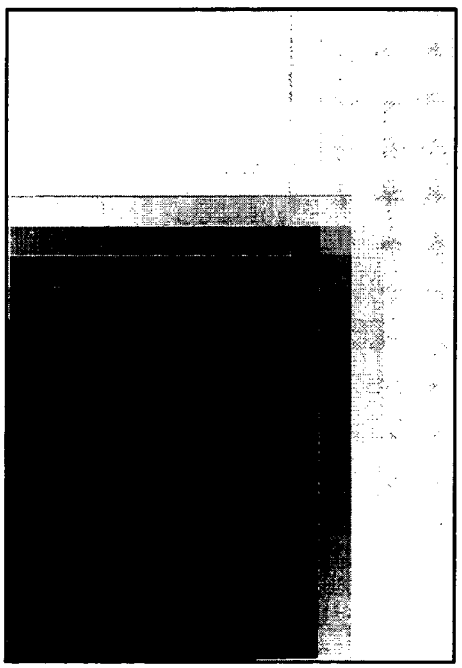
Figure 1D:
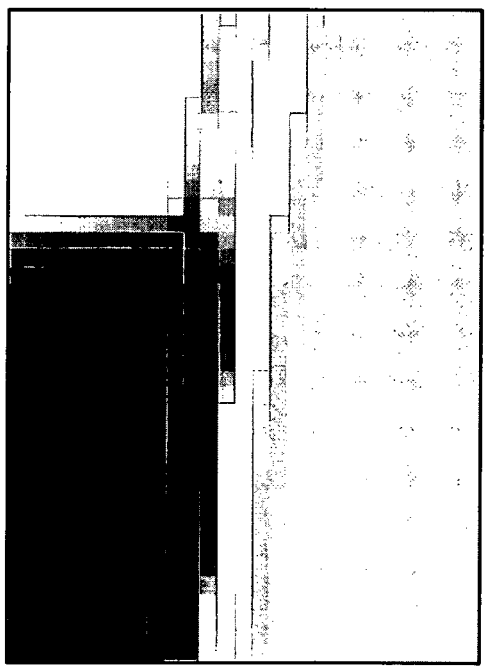

Network interface 1040 may be configured to enable computer system 1000 to communicate with other computers, systems or machines, such as across network 100, described above. Network 100 may enable data communication between computer system 1000 and among other entities illustrates in FIGS. 1A and 1B, described above. Network interface 1040 may use standard communications technologies and/or protocols. Network 100 may include, and network interface 1040 may utilize, links using technologies such as Ethernet, 802.11, integrated services digital network (ISDN), digital subscriber line (DSL), and asynchronous transfer mode (ATM) as well as other communications technologies. Similarly, the networking protocols used on network 100 may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over network 100 by network interface 1040 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

In some embodiments, memory 1010 may include program instructions configured to implement a selective sharpening tool 120, as described herein. Selective sharpening tool 120 may be implemented in any of various programming languages or methods. For example, in one embodiment, selective sharpening tool 120 may be JAVA based, while in another embodiments, it may be implemented using the C or C++ programming languages.

While the selective sharpening tool has been described with reference to various embodiments, it will be understood that these embodiments are illustrative and that the scope of the document-based data collection system is not limited to them. Many variations, modifications, additions, and improvements are possible. More generally, the present selective sharpening tool is described in the context of particular embodiments. For example, the blocks and logic units identified in the description are for ease of understanding and not meant to limit the selective sharpening tool to any particular embodiment. Functionality may be separated or combined in blocks differently in various realizations or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A system, comprising:
   one or more processors;
   memory coupled to the one or more processors, wherein the memory stores program instructions executable by the one or more processors to:
   receive user input indicating a sharpening limit for an image;
   determine, based on the sharpening limit, a portion of a plurality of pixels of the image to which to apply a sharpening function, wherein the portion is less than all the plurality of pixels, and wherein whether or not each pixel of the plurality of pixels is included in the portion is dependent upon the sharpening limit and upon a sharpness of the pixel relative to others of the plurality of pixels; and
   apply the sharpening function to the determined portion of the plurality of pixels without applying the sharpening function to ones of the plurality of pixels not included in the determined portion.

2. The system as recited in claim 1, wherein the program instructions are further executable to receive user input indicating a region of the image comprising the plurality of pixels.

3. The system as recited in claim 1, wherein the plurality of pixel comprises the entire image.

4. The system as recited in claim 1, wherein the program instructions are further configured to determine a sharpness value for each of the plurality of pixels.

5. The system as recited in claim 4, wherein the program instructions are further executable to rank each of the plurality of pixels according to each pixel's respective sharpness value, and wherein the sharpening limit indicates a lower ranked percentage of the plurality of pixels.

6. The system as recited in claim 4, wherein the sharpness limit comprises an upper sharpness limit and lower sharpness limit, wherein the program instructions are further executable to rank each of the plurality of pixels according to each pixel's respective sharpness value, and wherein the sharpening limit indicates a percentage of the plurality of pixels ranked between the upper sharpness limit and the lower sharpness limit.

7. The system as recited in claim 4, wherein to rank the plurality of pixels the program instructions are further executable to determine a sharpness percentile for each of the plurality of pixels based on a comparison of the each pixel's respective sharpness value.

8. The system as recited in claim 4, wherein to determine a sharpness value for the pixel the program instructions are executable to sum squared differences of respective pixel values for two or more other pixels proximate to the pixel.

9. The system as recited in claim 8, wherein to sum the squared difference of pixel values for two or more other pixels proximate to the pixel the program instructions are executable to:
   calculate a difference between the pixel values of horizontally adjacent pixels proximate to the pixel;
   square the difference between the pixel values of the horizontally adjacent pixels;
   calculate a difference between the pixel values of vertically adjacent pixels proximate to the pixel;
   square the difference between the pixel values of the vertically adjacent pixels; and
   sum the squared differences.

10. The system as recited in claim 1, wherein the program instructions are further executable to display a visual indication of the determined portion of the plurality of pixels.

11. The system as recited in claim 10, wherein the program instructions are further executable to:
   receive additional input indicating a new sharpening limit;
   determine, based on the new sharpening limit, a new portion of the plurality of pixels to which to apply the sharpening function; and
   display a new visual indication of the determined portion of the plurality of pixels.

12. A computer-implemented method, comprising:
receiving user input indicating a sharpening limit for an image;
determining, based on the sharpening limit, a portion of a plurality of pixels of the image to which to apply a sharpening function, wherein the portion is less than all the plurality of pixels, and wherein whether or not each pixel of the plurality of pixels is included in the portion is dependent upon the sharpening limit and upon a sharpness of the pixel relative to others of the plurality of pixels; and
applying the sharpening function to the determined portion of the plurality of pixels without applying the sharpening function to ones of the plurality of pixels not included in the determined portion.

13. The method as recited in claim 12, further comprising receiving user input indicating a region of the image comprising the plurality of pixels.

14. The method as recited in claim 12, wherein the plurality of pixel comprises the entire image.

15. The method as recited in claim 12, further comprising determining a sharpness value for each of the plurality of pixels.

16. The method as recited in claim 15, further comprising ranking each of the plurality of pixels according to each pixel's respective sharpness value, wherein the sharpening limit indicates a lower ranked percentage of the plurality of pixels.

17. The method as recited in claim 15, wherein the sharpness limit comprises an upper sharpness limit and lower sharpness limit, the method further comprising ranking each of the plurality of pixels according to each pixel's respective sharpness value, and wherein the sharpening limit indicates a percentage of the plurality of pixels ranked between the upper sharpness limit and the lower sharpness limit.

18. The method as recited in claim 15, wherein ranking the plurality of pixels comprises determining a sharpness percentile for each of the plurality of pixels based on a comparison of the each pixel's respective sharpness value.

19. The method as recited in claim 15, wherein determining a sharpness value for each of the pixels comprises summing squared differences of respective pixel values for two or more other pixels proximate to each respective pixel.

20. The method as recited in claim 19, wherein summing the squared difference of pixel values for two or more other pixels proximate to each respective pixel comprises, for each respective pixel in the plurality of pixels:
calculating a difference between the pixel values of horizontally adjacent pixels proximate to the respective pixel;
squaring the difference between the pixel values of the horizontally adjacent pixels;
calculating a difference between the pixel values of vertically adjacent pixels proximate to the respective pixel;
squaring the difference between the pixel values of the vertically adjacent pixels; and
summing the squared differences.

21. The method as recited in claim 12, further comprising displaying a visual indication of the determined portion of the plurality of pixels.

22. The method as recited in claim 21, further comprising:
receiving additional input indicating a new sharpening limit;
determining, based on the new sharpening limit, a new portion of the plurality of pixels to which to apply the sharpening function; and
displaying a new visual indication of the determined portion of the plurality of pixels.

23. A computer-readable storage medium, comprising program instructions computer-executable to implement:
receiving user input indicating a sharpening limit for an image;
determining, based on the sharpening limit, a portion of a plurality of pixels of the image to which to apply a sharpening function, wherein the portion is less than all the plurality of pixels, and wherein whether or not each pixel of the plurality of pixels is included in the portion is dependent upon the sharpening limit and upon a sharpness of the pixel relative to others of the plurality of pixels; and
applying the sharpening function to the determined portion of the plurality of pixels without applying the sharpening function to ones of the plurality of pixels not included in the determined portion.

24. The medium as recited in claim 23, wherein the program instructions are further executable to implement receiving user input indicating a region of the image comprising the plurality of pixels.

25. The medium as recited in claim 23, wherein the plurality of pixel comprises the entire image.

26. The medium as recited in claim 23, wherein the program instructions are further executable to implement determining a sharpness value for each of the plurality of pixels.

27. The medium as recited in claim 26, wherein the program instructions are further executable to implement ranking each of the plurality of pixels according to each pixel's respective sharpness value, wherein the sharpening limit indicates a lower ranked percentage of the plurality of pixels.

28. The medium as recited in claim 26, wherein the sharpness limit comprises an upper sharpness limit and lower sharpness limit, wherein the program instructions are further executable to implement ranking each of the plurality of pixels according to each pixel's respective sharpness value, and wherein the sharpening limit indicates a percentage of the plurality of pixels ranked between the upper sharpness limit and the lower sharpness limit.

29. The medium as recited in claim 26, wherein ranking the plurality of pixels comprises determining a sharpness percentile for each of the plurality of pixels based on a comparison of the each pixel's respective sharpness value.

30. The medium as recited in claim 26, wherein determining a sharpness value for each of the pixels comprises summing squared differences of respective pixel values for two or more other pixels proximate to each respective pixel.

31. The medium as recited in claim 30, wherein summing the squared difference of pixel values for two or more other pixels proximate to each respective pixel comprises, for each respective pixel in the plurality of pixels:
calculating a difference between the pixel values of horizontally adjacent pixels proximate to the respective pixel;
squaring the difference between the pixel values of the horizontally adjacent pixels;
calculating a difference between the pixel values of vertically adjacent pixels proximate to the respective pixel;
squaring the difference between the pixel values of the vertically adjacent pixels; and
summing the squared differences.

32. The medium as recited in claim 23, wherein the program instructions are further executable to implement displaying a visual indication of the determined portion of the plurality of pixels.

33. The medium as recited in claim 32, wherein the program instructions are further executable to implement:

receiving additional input indicating a new sharpening limit;

determining, based on the new sharpening limit, a new portion of the plurality of pixels to which to apply the sharpening function; and displaying a new visual indication of the determined portion of the plurality of pixels.

* * * * *